United States Patent
Pawlowski

(10) Patent No.: US 11,907,560 B2
(45) Date of Patent: *Feb. 20, 2024

(54) CODE WORD FORMAT AND STRUCTURE

(71) Applicant: Micron Technology, Inc., Boise, ID (US)

(72) Inventor: Joseph Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/049,870

(22) Filed: Oct. 26, 2022

(65) Prior Publication Data

US 2023/0078205 A1    Mar. 16, 2023

Related U.S. Application Data

(60) Division of application No. 17/075,235, filed on Oct. 20, 2020, now Pat. No. 11,520,513, which is a
(Continued)

(51) Int. Cl.
*G11C 29/00* (2006.01)
*G06F 3/06* (2006.01)
*G06F 11/10* (2006.01)

(52) U.S. Cl.
CPC .......... *G06F 3/0644* (2013.01); *G06F 3/0619* (2013.01); *G06F 3/0655* (2013.01);
(Continued)

(58) Field of Classification Search
CPC .... G06F 3/0644; G06F 3/0619; G06F 3/0655; G06F 3/0673; G06F 11/1004; G06F 11/1076
See application file for complete search history.

(56) References Cited

U.S. PATENT DOCUMENTS 7,050,419 B2    5/2006    Azenkot et al.
9,372,870 B1    6/2016    Levy
(Continued)

FOREIGN PATENT DOCUMENTS

CN    103150275 A    6/2013
CN    103562894 A    2/2014
(Continued)

OTHER PUBLICATIONS

Schoney, C., et al., "Analysis and coding schemes for the flash normal-Ia place mixture channel", 2015 IEEE International Symposium on Information Theory (ISIT), Jan. 10, 2015, pp. 2101-2105.
(Continued)

*Primary Examiner* — Christine T. Tu
(74) *Attorney, Agent, or Firm* — Holland & Hart LLP

(57) ABSTRACT

Methods, systems, and devices for code word formats and structures are described. A code word format and structure may include various fields that facilitate a reliable transaction of user data during an access operation associated with a memory medium. For example, the bit fields may include information directed to an error control operation for a port manager to perform on a code word configured in accordance with the code word format and structure. Additionally, the code word format and structure may be configured for low latency operation and reliable transaction of the user data during the access operation. For example, the port manager may receive a first portion of the code word and parse the first portion of the code word concurrently with receiving an additional portion of the code word.

17 Claims, 6 Drawing Sheets

Related U.S. Application Data continuation of application No. 16/551,484, filed on Aug. 26, 2019, now Pat. No. 10,831,389, which is a continuation of application No. 16/249,808, filed on Jan. 16, 2019, now Pat. No. 11,003,375.

(60) Provisional application No. 62/671,920, filed on May 15, 2018.

(52) U.S. Cl.
CPC ........ *G06F 3/0673* (2013.01); *G06F 11/1004* (2013.01); *G06F 11/1076* (2013.01)

(56) References Cited

U.S. PATENT DOCUMENTS

| | | | |
|---|---|---|---|
| 10,201,005 B2 | 2/2019 | Yang et al. | |
| 10,534,565 B1* | 1/2020 | Banerjee | G11C 11/4094 |
| 10,831,653 B2 | 11/2020 | Pawlowski | |
| 11,003,375 B2 | 5/2021 | Pawlowski | |
| 11,386,003 B2 | 7/2022 | Pawlowski | |
| 11,630,721 B2* | 4/2023 | Kim | G06F 11/1004 365/185.09 |
| 2002/0010888 A1 | 1/2002 | Kwon | |
| 2003/0066017 A1 | 4/2003 | Kuwamura | |
| 2004/0216027 A1 | 10/2004 | Ueno | |
| 2005/0025145 A1 | 2/2005 | Rakib et al. | |
| 2007/0171714 A1 | 7/2007 | Wu et al. | |
| 2009/0063731 A1 | 3/2009 | Gower et al. | |
| 2009/0063922 A1 | 3/2009 | Gower et al. | |
| 2009/0245426 A1 | 10/2009 | Ratnakar et al. | |
| 2010/0037117 A1 | 2/2010 | Pescatore | |
| 2010/0141489 A1 | 6/2010 | Reznik | |
| 2010/0214811 A1 | 8/2010 | Franceschini et al. | |
| 2010/0228932 A1 | 9/2010 | Bae et al. | |
| 2012/0051752 A1 | 3/2012 | Tamai et al. | |
| 2012/0166904 A1 | 6/2012 | Bandholz | |
| 2013/0179753 A1 | 7/2013 | Flynn et al. | |
| 2013/0262753 A1 | 10/2013 | Prins et al. | |
| 2014/0122974 A1 | 5/2014 | Yun | |
| 2014/0157054 A1 | 6/2014 | Yoon et al. | |
| 2015/0286440 A1 | 10/2015 | Driever et al. | |
| 2015/0347015 A1 | 12/2015 | Pawlowski | |
| 2016/0110252 A1 | 4/2016 | Hyun et al. | |
| 2016/0134307 A1 | 5/2016 | Hu et al. | |
| 2016/0148702 A1 | 5/2016 | Karakulak et al. | |
| 2016/0224414 A1 | 8/2016 | Trombley | |
| 2016/0276035 A1 | 9/2016 | So et al. | |
| 2017/0052846 A1 | 2/2017 | DeBenedictis | |
| 2017/0091025 A1* | 3/2017 | Ahn | H03M 13/2909 |
| 2018/0074893 A1 | 3/2018 | Vaidhyanathan et al. | |
| 2018/0152206 A1* | 5/2018 | Sin | H03M 13/2906 |
| 2019/0042358 A1 | 2/2019 | Criss et al. | |
| 2019/0354305 A1 | 11/2019 | Pawlowski | |
| 2021/0083692 A1 | 3/2021 | Petrov | |

FOREIGN PATENT DOCUMENTS

| | | |
|---|---|---|
| CN | 103839595 A | 6/2014 |
| JP | 2017-168089 A | 9/2017 |
| KR | 10-2009-0078285 A | 7/2009 |
| KR | 10-2016-0040284 A | 4/2016 |
| KR | 10-2016-0054395 A | 5/2016 |
| WO | 2012/168099 A1 | 12/2012 |

OTHER PUBLICATIONS

Chinese Patent Office, "Office Action and Search Report", issued in connection with Chinese Patent Application No. 201910247705.6 dated Nov. 11, 2022 (6 pages). (Foreign language).

Chinese Patent Office, "Office Action", issued in connection with Chinese Patent Application No. 201910220639.3 dated Nov. 28, 2022 (7 pages).

Daxue Liu, "NoC tolerant MBU soft error structure reinforcement technology based on two-dimensional error correction code," China Excellent Master's Dissertation Full-text Database (Electronic Journal), 2018, 3 pages.

European Patent Office, "Extended Search Report," issued in connection with European Patent Application No. 19802866.4, dated Aug. 23, 2021 (7 pages).

European Patent Office, "Extended Search Report," issued in connection with European Patent Application No. 19804399.4, dated Aug. 23, 2021 (8 pages).

International Search Report and Written Opinion received for PCT Patent Application No. PCT/US19/031463, dated Aug. 19, 2019, 7 pages.

International Search Report and Written Opinion received for PCT Patent Application No. PCT/US19/31464, dated Aug. 9, 2019, 7 pages.

Kanaoka, T., et al., Structured LDPC codes with Reversed Mtr/ECC for Magnetic Recording Channels, IEEE, vol. 42, No. 10, 2007, pp. 2561-2563.

Korean Patent Office, "Notice of Allowance", issued in connection with Korean Patent Application No. 10-2020-7035446 dated May 9, 2022 (7 pages).

Korean Patent Office, "Notice of Allowance," issued in connection with Korean Patent Application No. 10-2020-7034880 dated Oct. 7, 2022 (4 pages).

Li, K., et al., "Channels with both random errors and burst erasures: Capacities, LDPC code thresholds, and code performances", 2010 IEEE International Symposium on Information theory, Jul. 23, 2010. pp. 699-703.

Chinese Patent Office, "Notice of Allowance," issued in connection with Chinese Patent Application No. 201910220639.3 dated Jul. 28, 2023 (8 pages total; 4 pages original & 4 pages translation).

* cited by examiner

CODE WORD FORMAT AND STRUCTURE

CROSS REFERENCE

The present Application for patent is a divisional of U.S. patent application Ser. No. 17/075,235 by Pawlowski, entitled "Code Word Format and Structure" filed Oct. 20, 2020, which is a continuation of U.S. patent application Ser. No. 16/551,484 by Pawlowski, entitled "Code Word Format and Structure" filed Aug. 26, 2019, which is a continuation of U.S. patent application Ser. No. 16/249,808 by Pawlowski, entitled "Code Word Format and Structure" filed Jan. 16, 2019 which claims priority to U.S. Provisional Patent Application No. 62/671,920 by Pawlowski, entitled "Code Word Format and Structure" filed May 15, 2018; each of which is assigned to the assignee hereof and each of which is expressly incorporated by reference in its entirety.

BACKGROUND

The following relates generally to operating a memory subsystem or system and more specifically to a code word format and structure.

A computing system may include a memory subsystem or system including various kinds of memory devices and controllers that are coupled with one or more buses to manage information in numerous electronic devices such as computers, wireless communication devices, internet of things, cameras, digital displays, and the like. Memory devices are widely used to store information in such electronic devices. Information is stored by programing different states of a memory device. For example, binary devices have two states, often denoted by a logic "1" or a logic "0." In other systems, more than two states may be stored in memory devices. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous DRAM (SDRAM), ferroelectric RAM (FeRAM), magnetic RAM (MRAM), resistive RAM (RRAM), flash memory, not-AND (NAND) memory, phase change memory (PCM), and others. Memory devices may be volatile or non-volatile. Non-volatile memory cells may maintain their stored logic state for extended periods of time even in the absence of an external power source. Volatile memory cells (e.g., DRAM cells) may lose their stored state over time unless they are periodically refreshed by an external power source.

Improving a computing system may include enhancing a memory subsystem's performance, such as reducing power consumption, increasing memory capacity, improving read/write speeds, providing non-volatility by use of persistent memory media, or reducing manufacturing costs at a certain performance point, among other metrics. Techniques to address latency during one or more access operations may be desirable.

DETAILED DESCRIPTION

Figure 1:
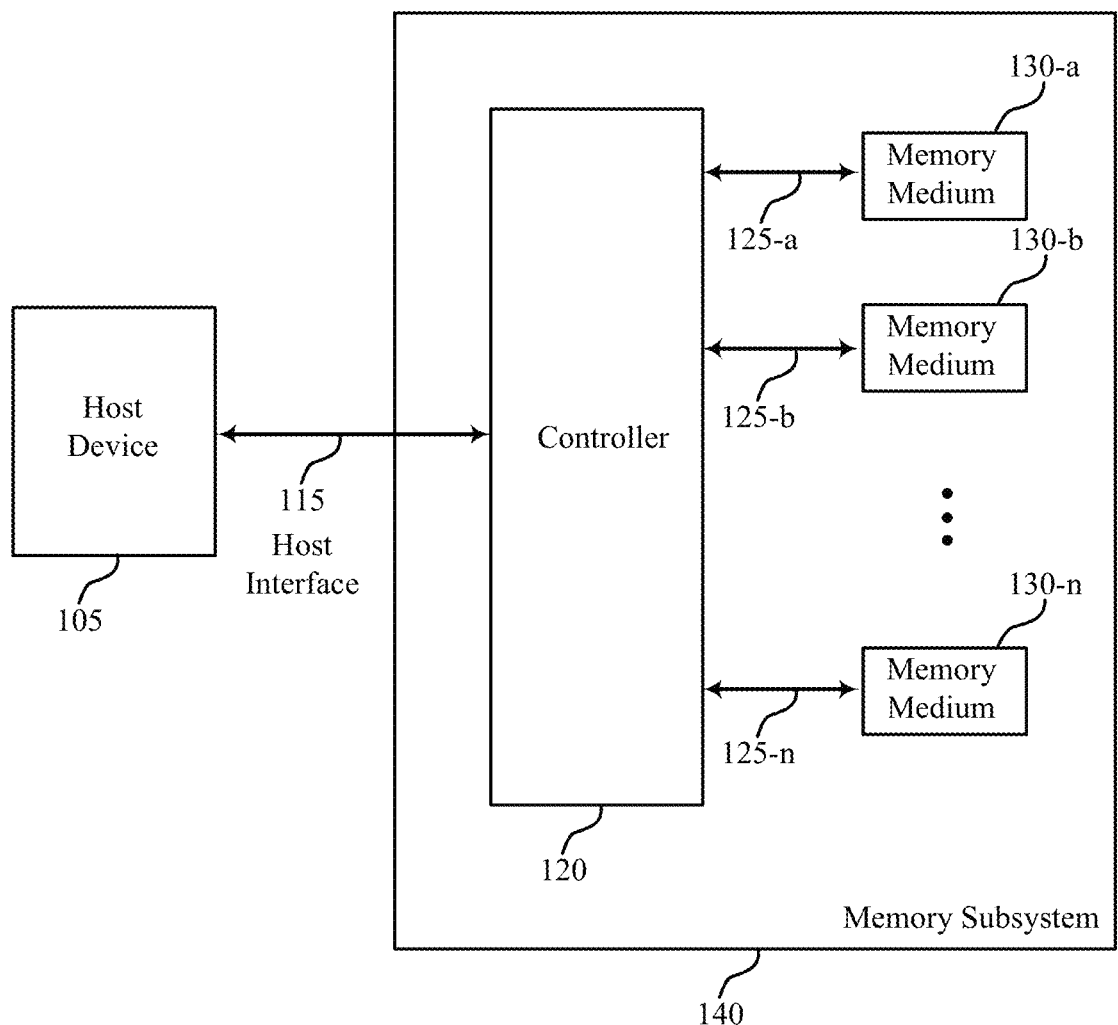
FIG. 1 illustrates an example of a computing system that supports a code word format and structure in accordance with aspects of the present disclosure.

Performance of a computing system (e.g., a server including a memory subsystem or system) may depend on various factors, such as supplying reliable information to the computing system with a low latency (e.g., a load-to-use latency). A latency in a memory subsystem or system may refer to a time to make a unit of data available to a host device which requested the data. In the context of a computing system, the unit of data may be referred to as a code word. A relatively long latency associated with supplying a reliable code word may adversely impact overall performance of the computing system, including impacting a data transfer rate between the host device and the memory subsystem or system during one or more access operations. Code word formats and structures (which may also be referred to as a code word layout) described in the present disclosure may facilitate low latency operations associated with a code word to improve overall performance of the computing system. A system, or subsystem, using a code word format and structure (e.g., a code word layout) may parallelize various operations associated with the code word in response to receiving an access command from the host device to supply reliable information to the host device with a low latency.

In some cases, a code word may include an amount of user data. A size of user data related to an access operation (e.g., read operation, write operation) may be 128 bytes (e.g., 1,024 bits), while a size of a code word may be greater than 128 bytes, in some cases, due to additional bits being included. The code word format disclosed herein may allocate a first group of additional bits in a code word to produce reliable user data during a transaction associated with the access operation (e.g., through an error control operation using the information from the first group of the additional bits). In addition, the code word format may allocate a second group of additional bits to indicate a condition of the code word.

A code word format, which may also be referred to as a code word layout, may specify that the second group of the additional bits be located in a first portion of the code word (e.g., in a first burst of the code word). In this manner, a system or subsystem may initiate a series of operations based on determining the condition of the code word while the system or subsystem receives a second portion (e.g., a remaining portion, an additional portion) of the code word to facilitate a low latency operation. Further, the code word layout may allocate a third group of additional bits to indicate various states related to the code word (e.g., a quantity of access operations associated with the code word, an invalid portion of the code word).

A system or subsystem configured according to the present disclosure may include a plurality of port managers to support a high performance of a computing system. The system or subsystem may be coupled with a host device through one or more host interfaces. The system or subsystem may receive a request from the host device (e.g., a host request) through the host interfaces. An individual port manager of the plurality of port managers may be coupled with a memory medium through a channel. The channel may be referred to as an aggregated channel because an aggregated amount or set of data may be exchanged over the channel, in some cases. The memory medium may be configured to include one or more memory dice (e.g., 3D XPoint™ memory dice, which may be referred to as 3DXP dice). In some cases, the memory medium may be configured to include a quantity of memory dice (e.g., eleven (11) memory dice) in a parallel configuration.

In some cases, each memory die (e.g., each 3DXP memory die) may produce an amount of data (e.g., 128 bits of data) as a unit from the memory die in association with an access operation. The amount of data (e.g., 128 bits of data) may include a sequence of bursts (e.g., sixteen (16) bursts), each burst including a second amount of data (e.g., eight (8) bits of data) transmitted over a bus (e.g., an 8-bits wide bus) from the memory die.

As an example, when a memory medium includes eleven (11) memory dice operating in parallel, and when each memory die of the eleven (11) memory dice produces eight (8) bits of data at a given burst, the memory medium may produce 88 bits of data as a unit for a given burst. As eleven (11) memory dice may produce data over a total of sixteen (16) bursts, each burst including 88 bits of data from eleven (11) memory dice, a unit of data associated with the memory medium during an access operation—e.g., the unit of data transmitted over the channel (e.g., an aggregated channel)—may include 1,408 bits. As such, a code word (e.g., a unit of data during a transaction of an access operation) associated with a memory medium may include 1,408 bits, in this example. In some cases, a burst may be referred to as a channel burst. In some cases, a channel between a port manager and a memory medium may include a plurality of channels, in which each channel of the plurality of channels may be associated with a memory die of the memory medium.

A code word format and structure (e.g., a code word layout) in accordance with the present disclosure may include a set of bit fields indicative of a plurality of channel bursts across a plurality of channels. A port manager may configure a code word (e.g., a code word of 1,408 bits) using the code word format and structure to facilitate low latency operation associated with a code word exchanged over one or more channels (e.g., an aggregated channel) between two devices, for example between the port manager and a memory medium coupled with the port manager. The set of bit fields (e.g., bit fields) in a first channel burst of the code word layout may be assigned with various information associated with the code word. As such, the port manager may receive the quantity of fields at the first channel burst and interpret (e.g., parse) information from the quantity of fields therein. In some examples, the port manager may reconfigure the code word based on parsing the information concurrently with receiving an additional portion of the code word, which may decrease the resulting latency. Thus, a code word layout in accordance with the present disclosure may facilitate low latency operations associated with the memory medium during one or more access operations by facilitating the port manager to initiate various memory operations based on receiving at least a part of the code word.

Features of the disclosure introduced herein are further described below at an exemplary computing system level in the context of FIG. 1. Specific examples of a computing system and a code word layout are then described in the context of FIGS. 2 through 3. These and other features of the disclosure are further illustrated by and described with reference to an apparatus diagram of FIG. 4 that describes various components related to a controller as well as flowcharts of FIGS. 5 and 6 that relate to operations using a code word layout. Many of the following examples are described in the context of a memory subsystem; and the described features are applicable to other computing systems and subsystems.

FIG. 1 illustrates an example of a computing system 100 supports a code word format and structure in accordance with aspects of the present disclosure. The computing system 100 may include a host device 105 coupled with a device 140 through a host interface 115 (which may also be referred to as a host link). The host device 105 may be or include a server, a system on a chip (SoC), a central processing unit (CPU), or graphics processing unit (GPU), among other devices. In some examples, the host device 105 may access (e.g., read from, write to) one or more memory media 130 located in the device 140 through the host interface 115.

The host interface 115 (e.g., the host link 115) may be compatible with or employ a protocol (e.g., the Gen-Z, the Cache Coherent Interconnect for Accelerators (CCIX) protocol) to facilitate access operations between the host device 105 and the one or more memory media 130. The host interface 115 may be configured to transfer data at a first data transfer rate (e.g., 25 gigabytes per second (GBps)) in at least one direction (e.g., sending or receiving). In some examples, a 25 GBps data transfer rate may support approximately 586 million transactions per second when a transaction is 64 bytes. In other examples, a 25 GBps data transfer rate may support approximately 312.5 million transactions per second when a transaction is 128 bytes.

The device 140 may, in some cases, be referred to as a memory system or subsystem, or a memory device. The device 140 may include a controller 120 that may be coupled with the one or more memory media 130 through channels 125. In some cases, the channels 125 may be referred to as aggregated channels 125 including a plurality of other channels (e.g., channels having a smaller bandwidth than the aggregated channel 125) as described with reference to FIG. 2. In some examples, the controller 120 and the one or more memory media 130 may be integrated with, in contact with, or placed on a board (e.g., a peripheral component interconnect express (PCIe) board).

The controller 120 may include various functional blocks that facilitate operations of the device 140 in conjunction with the one or more memory media 130. In some cases, the controller 120 may include aspects of an interface controller to accommodate different specifications, constraints, or characteristics associated with the host interface 115, the channels 125, or both. In some examples, the controller 120 may be an ASIC, a general-purpose processor, other programmable logic device, discrete hardware components (e.g., a chiplet), or it may be a combination of components.

In some cases, the controller 120 may configure a code word in accordance with a code word format and structure of a plurality of channel bursts across a channel (e.g., a channel 125-a, an aggregated channel). In some cases, the code word layout may facilitate low latency operation of the device 140 during an access operation. Additionally, the controller 120 may receive, from the host device 105, a host request (e.g., an access command to read from or write to memory cells in the one or more memory media 130) through the host interface 115. The controller 120 may generate an access command based on receiving the host request to read memory cells in the one or more memory media 130.

In some cases, the controller 120 may receive a first portion of a code word from a memory medium (e.g., memory medium 130-a) based on transmitting an access command to read memory cells in the memory medium. The controller 120 may interpret (e.g., identify, parse, etc.) the first portion of the code word concurrently with receiving an additional portion of the code word. Further, the controller 120 may communicate with the memory medium based on parsing the first portion of the code word. In some cases, the controller 120 may reconfigure the code word based on parsing the first portion of the code word concurrently with receiving the additional portion of the code word. Further, the controller 120 may communicate with the memory medium based on reconfiguring the code word.

In some cases, the controller 120 may read data from or write data at a memory medium 130 (e.g., memory medium 130-a) in conjunction with a local controller (e.g., local to the memory medium 130-a) that may perform various operations (e.g., writing data to memory cells, reading data from memory cells, arranging a code word in accordance with the code word format and structure). In some examples, the local controller may send requested data to the controller 120 through one of the channels 125, which may be an example of an aggregated channel.

Each memory medium (e.g., a memory medium 130-a) may include multiple memory dice (e.g., sixteen (16) memory dice) to obtain a specified or desired memory capacity of the memory medium. In some examples, the memory dice may include a three-dimensional cross-point array of memory cells including chalcogenide (e.g., 3DXP dice). In other examples, the memory dice may include other kinds of memory devices (e.g., FeRAM dice, MRAM dice, PCM dice). In some examples, a code word (e.g., a code word including 128 bytes of user data) may be divided across the multiple memory dice within a memory medium (e.g., the memory medium 130-a).

The channels 125 may be configured to transport data (e.g., a code word) between the controller 120 and the one or more memory media 130. Each of the channels 125 (e.g., the channel 125-a that may be an example of an aggregated channel) may include a plurality of other channels (e.g., channels having a smaller bandwidth than the channel 125-a) for transporting data (e.g., a code word) in parallel. In some cases, a code word may include user data (e.g., 128 bytes of user data in a code word) and other set of data (e.g., remaining data in the code word). Each of the channels 125 (e.g., the channel 125-a that may be an example of an aggregated channel) may include additional channels to carry information related to various auxiliary functions such as metadata. In some cases, a code word layout may define how each of the channels 125 (e.g., the channel 125-a) may transport data (e.g., a code word) between the controller 120 and the one or more memory media 130.

In some cases, a device or system may include a memory medium and a controller in electronic communication with the memory medium and a host device. The controller may be operable to receive a first portion of a code word associated with the memory medium, the code word including a set of bit fields indicative of a plurality of channel bursts across a plurality of channels, parse the first portion of the code word concurrently with receiving an additional portion of the code word based on receiving the first portion of the code word, and communicate with the memory medium or the host device based on parsing the first portion of the code word.

Figure 2:
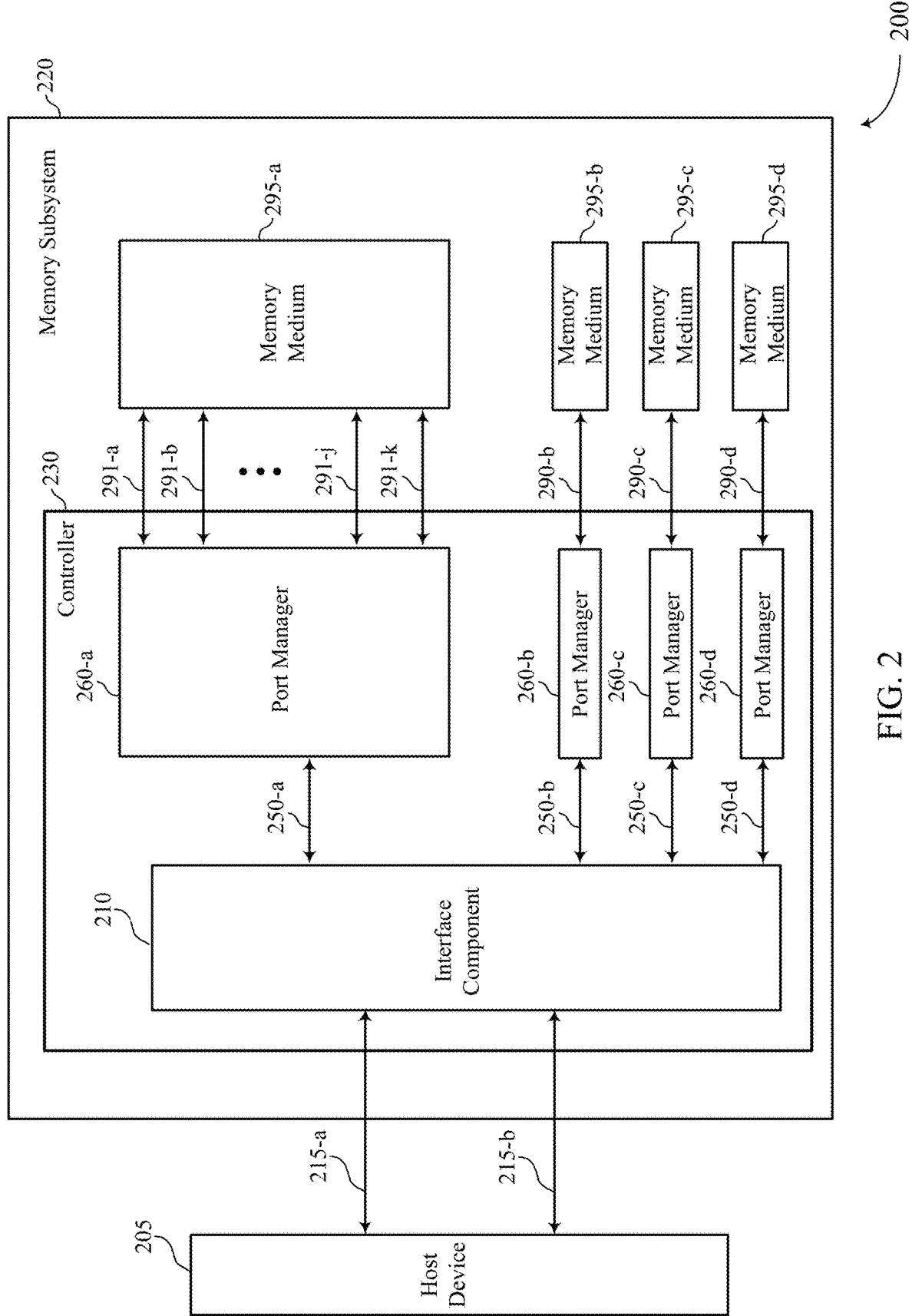
FIG. 2 illustrates an example of a computing system that supports a code word format and structure in accordance with aspects of the present disclosure.

FIG. 2 illustrates an example of a computing system 200 that supports a code word format and structure in accordance with aspects of the present disclosure. The computing system 200 may be an example of the computing system 100 described with reference to FIG. 1. The computing system 200 may include a host device 205 coupled with a memory subsystem or system 220 using at least one host interface (e.g., a host interface 215-a). In some cases, the host interfaces 215 may be referred to as a host link or host links. The host device 205 may be an example of the host device 105 described with reference to FIG. 1. The host interfaces 215 may be examples of the host interface 115 described with reference to FIG. 1. In some examples, the host interfaces 215 may be configured to transfer data at a first data transfer rate (e.g., 50 GBps with 25 GBps in each direction).

The computing system 200 may include the memory subsystem or system 220. The memory subsystem or system 220 may be an example of the device 140 described with reference to FIG. 1. The memory subsystem or system 220 may be referred to as a memory device or memory devices. The memory subsystem or system 220 may include a controller 230. The controller 230 may be an example of the controller 120 described with reference to FIG. 1. The controller 230 may include an interface component 210 and a plurality of port managers 260.

The interface component 210 may be configured to facilitate data exchange between the host device 205 and the memory subsystem or system 220 through the host interfaces 215. The interface component 210 may be configured to exchange data with the plurality of port managers 260 (e.g., using signal paths 250). Each signal path of the signal paths 250 may be configured to exchange data at a rate (e.g., 12.8 GBps) different from the first data transfer rate of the host interfaces 215. In some cases, the interface component 210 may be configured to provide a routing network function to allow more than one host interface (e.g., host interface 215-a and host interface 215-b) to be associated with the plurality of port managers 260.

Each port manager (e.g., the port manager 260-b) of the plurality of the port managers 260 may be coupled with a memory medium (e.g., the memory medium 295-b) through an aggregated channel (e.g., the aggregated channel 290-b). In some examples, an individual port manager (e.g., the port manager 260-a) of the plurality of port managers 260 may operate independent of each other (e.g., the port managers 260-b, 260-c, and 260-c) and may support access operations associated with one or more memory media 295. The one or more memory media 295 may be examples of the one or more memory media 130 described with reference to FIG. 1. In some cases, each of the one or more memory media 295 may be referred to as a media port.

Each aggregated channel of the aggregated channels 290 may include one or more channels 291. In some cases, the channels 291 may be referred to as logic channels 291. In some examples, each channel 291 may be associated with a memory die in a memory medium (e.g., the memory medium 295-a) and may have a smaller bandwidth than the bandwidth of the aggregated channel (e.g., the aggregated channel 290-b). In some examples, an aggregated channel (e.g., an aggregated channel 290-a) may include eleven (11) channels 291 (e.g., channels 291-a through 291-k). As a person of ordinary skill in the art would appreciate, the one or more channels 291 (e.g., the channels 291-*a* through the channel 291-*k*) are depicted for the port manager 260-*a* representing one of the aggregated channels 290 (e.g., the aggregated channel 290-*a*) while the other aggregated channels 290 (e.g., the aggregated channels 290-*b*, 290-*c*, and 290-*d*) are depicted for port managers 260-*b*, 260-*c*, and 260-*d* without showing the one or more channels 291 associated with each aggregated channel, which is so depicted in order to increase visibility and clarity of the illustrated features.

An individual memory medium (e.g., the memory medium 295-*a*) of the one or more memory media 295 may include one or more memory devices (e.g., 3DXP dice). In some cases, the memory devices in the individual memory medium may be configured to operate in parallel to obtain a desired aggregated bandwidth through one of the aggregated channels 290. A 3DXP die, as one example, may be configured to have a 8-bits wide data bus and may be associated with each of channels 291 (e.g., the channel 291-*a*) rendering each channel 291 being 8-bits wide. In addition, a 3DXP die may be configured to produce 128-bits of data during a sequence of sixteen (16) bursts, in which each burst may produce 8-bits wide data over the channel 291. As such, 128-bits of data may be considered as a single unit of data that each 3DXP die generates based on an access command reading memory cells within the 3DXP die.

In some cases, a code word may be configured to include a set of bit fields (e.g., a layout) of a plurality of channel bursts (e.g., a sequence of sixteen (16) bursts) across a plurality of channels (e.g., eleven (11) channels 291-*a* through 291-*k* generating 88 bits of data per each channel burst). As such, the code word may in some cases include 1,408 bits of information. The description may be understood from a logical view of the memory medium. A larger quantity of physical 3DXP dice than a quantity of logical 3DXP dice may be present in a memory medium accounting for an overhead related to various access operations (e.g., read operation, write operation) associated with the memory medium. Within a memory medium, a code word may be divided into parts and written to or read from more than one die (e.g., 128 byte user data stored across ten 3DXP dice).

Various examples described herein use 3DXP dice to illustrate how the memory media 295 may be configured and operate in conjunction with the port managers 260 in accordance with the methods, devices, and systems supporting a code word format and structure of the present disclosure. In some cases, the memory media 295 may include other types of memory devices employing different memory technologies than 3DXP memory technology, such as FeRAM technology, PCM technology, MRAM technology, among others. As such, the present disclosure is not limited to a particular memory technology (e.g., 3D XPoint™ memory technology).

In some cases, a device or system may include a plurality of memory media, where at least one of the plurality of memory media may be configured to generate a code word including a set of bit fields indicative of a plurality of channel bursts across a plurality of channels, at least one host interface configured to receive an access command from a host device, and a plurality of port managers in electronic communication with the at least one host interface and each port manager in electronic communication with different one or more memory media of the plurality. In some cases, at least one port manager of the plurality may be configured to receive a first portion of the code word based on receiving an access command and may be configured to parse the first portion of the code word concurrently with receiving a second portion of the code word based on receiving the first portion of the code word.

In some examples of a device or system, the at least one port manager of the plurality may be configured to determine a code word condition indicated in a bit field of the set for the plurality of channels of a first channel burst of the plurality of channel bursts in the set of bit fields of the code word. In some examples of a device or system described, the at least one port manager of the plurality may be further configured to determine the code word condition by identifying information from the bit field of the set for the plurality of channels, the information indicating a first code word condition from a plurality of preconfigured code word conditions.

In some examples of a device or system, the at least one port manager of the plurality may be configured to identify spare bits including a bit field of the set for the plurality of channels within a first channel burst of the plurality of channel bursts in the set of bit fields of the code word, and parse the first portion of the code word based on identifying the spare bits. In some examples of a device or system, the at least one port manager of the plurality may be configured to identify cyclic redundancy check (CRC) bits including a bit field of the set for the plurality of channels within a first channel burst of the plurality of channel bursts in the set of bit fields of the code word, and parse the first portion of the code word based on identifying the CRC bits.

In some examples of a device or system, at least one of the plurality of memory media may include a phase change memory. In some examples of a device or system, the plurality of channels may include eleven (11) channels. In some examples of a device or system, the plurality of channel bursts may include sixteen (16) bursts.

Figure 3:
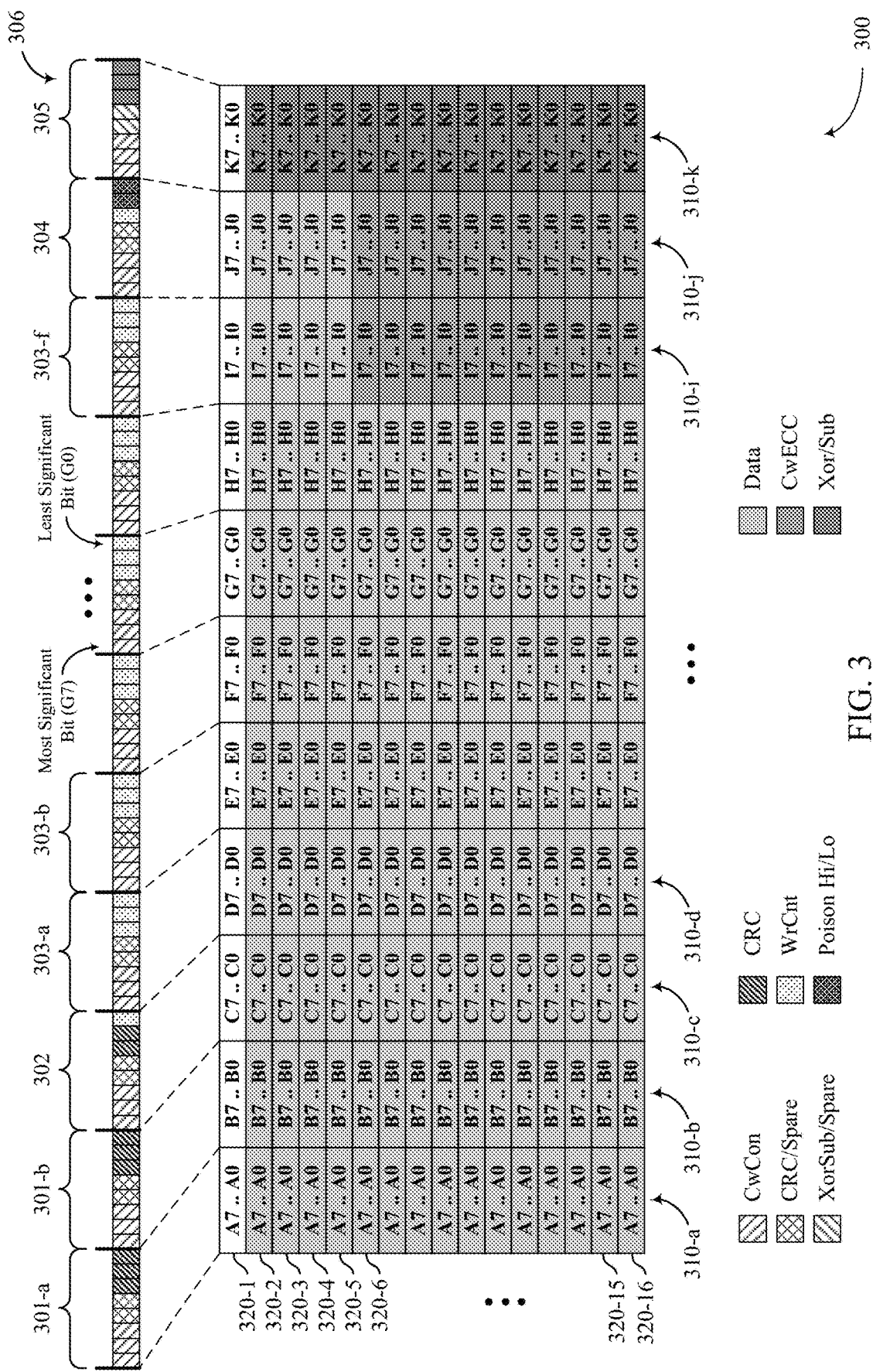
FIG. 3 illustrates an example of a code word format and structure in accordance with aspects of the present disclosure.

FIG. 3 illustrates an example of a code word format and structure 300 (e.g., a code word layout 300) in accordance with aspects of the present disclosure. The code word layout 300 may depict a code word format and structure for an entire code word. A code word may include a set of bit fields indicative of a plurality of channel bursts across a plurality of channels. FIG. 3 also includes layouts 301 through 305 (also referred to as formats) illustrating various configurations of layouts for an individual channel (e.g., the channel 291-*a* described with reference to FIG. 2). FIG. 3 also illustrates a layout 306, which may correspond to a portion of a code word (e.g., a subset of bit fields during a first channel burst across the plurality of channels). As an example of a code word format and structure, the code word layout 300 may include a quantity of fields (e.g., bit fields) of data (e.g., 1,408 bits of data) that may be produced by a memory medium (e.g., the memory medium 130-*a* or the memory medium 295-*a* described with reference to FIGS. 1 and 2) in response to an access command. The code word may include 128 bytes (e.g., 1,024 bits) of user data, which may be an object of an access command. Remaining bit fields within the code word (e.g., 384 bits of data) may carry various information that facilitates transferring of accurate user data during an access operation. Further, the remaining bits carrying the various information may be configured to facilitate low latency operations associated with the code word during the access operation.

The code word layout 300 may span a plurality of channels (e.g., channels 310-*a* through 310-*k*). In some cases, each channel (e.g., the channel 310-*a*) of the plurality of channels 310 may be associated with a 3DXP die, which may include an 8-bits wide data bus. As one example, each channel (e.g., each 3DXP die) may produce a total of 128 bits of data as a single object of a transaction associated with an access command (e.g., a read command) for a 3DXP die. Further, the 128 bits of data may be produced as a sequence of sixteen (16) channel bursts, each channel burst configured to produce eight (8) bits of data over the 8-bit wide data bus. Hence, each channel (e.g., each of the channels 310-a through 310-k) within a code word layout may correspond to 128 bits of data including sixteen (16) groups of 8-bit of data—e.g., G7 . . . G0 for channel 310-g, where G7 . . . G0 may represent a series of eight (8) 0s and 1s in which G7 may be the most significant bit (e.g., the eighth bit of the series of eight (8) 0s and 1s) and G0 may be the least significant bit (e.g., the first bit of the series of eight (8) 0s and 1s)), in which each group of sixteen (16) groups of 8-bits of data may be associated with one of sixteen (16) channel bursts.

In one example, the code word layout 300 may span across eleven (11) channels and each channel of the eleven (11) channels may produce 8-bits of data at each channel burst, then a total of 88 bits of data may be produced at each channel burst across the eleven (11) channels (e.g., the first channel burst 320-1 of 88 bits of data). Thus, the code word layout 300 may include 1,408 bits of data (e.g., the first channel burst 320-1 through the 16th channel burst 320-16, each channel burst producing 88 bits of data) as a single object of transaction associated with an access command (e.g., a read command) for a memory medium (e.g., the memory medium 130-a or the memory medium 295-a). The code word layout 300 may support a reliable transaction (e.g., conveying accurate contents of user data) with a low latency (e.g., a low quantity of clock edges to produce the user data) associated with an access command (e.g., a read command, a write command).

Each field (e.g., each bit field) or a set of fields (e.g., a set of bit fields) within a code word may include various information that facilitates the low-latency, reliable transaction of the user data as described below.

One or more fields (e.g., bit fields) within a code word layout may be configured to indicate a code word condition (e.g., using CwCon bits). In some cases, a code word may be configured in one of multiple possible states (e.g., four states). As an example, the CwCon bits may indicate a code word being one of a normal or a forwarded code word. A normal code word may, as one example, include the code word layout 300 described in the present disclosure. A forwarded code word may include a code word layout that may facilitate identification of a valid replacement address (e.g., forwarding address) for the code word. In some cases, a forwarded code word may include at least one copy of a valid address associated with the code word. Further, the CwCon bits may additionally or alternatively indicate a code word being one of a non-inverted code word or an inverted code word. In some cases, logic states of bits (e.g., 1s and 0s) within an inverted code word may need to be inverted (e.g., flipped, reversed) before information of the inverted code word may be interpreted (e.g., parsed) whereas the non-inverted code word may not need to be inverted before interpreting (e.g., parsed) information of the non-inverted code word.

One or more fields (e.g., bit fields) within a code word layout may be configured to indicate a quantity of access operations (e.g., read operations, write operations) associated with the code word (e.g., WrCnt bits). In some cases, WrCnt bits may facilitate a determination of a proper biasing scheme to read the code word based on the quantity of access operations stored in the WrCnt bits.

One or more fields (e.g., bit fields) within a code word layout may be configured to indicate that a portion of the code word may be invalid (e.g., using poison bits). In some cases, poison bits may be used as a flag to indicate a portion of the code word being invalid. In some examples, the poison bits (e.g., flag bits) may indicated a lower half of user data (e.g., D511 . . . D0 bits, where D0 represents the least significant bit out of 1,024 bits of user data) being invalid. In other examples, the poison bits (e.g., flag bits) may indicated an upper half of user data (e.g., D1023 . . . D512 bits, where D1023 represents the most significant bit out of 1,024 bits of user data) being invalid.

One or more fields (e.g., bit fields) within a code word layout may be configured as cyclic redundancy check (CRC) bits. In some cases, CRC bits may protect data within a code word by detecting a presence of at least one error bit within the code word. For example, CRC bits may protect information contained in the user data (e.g., 1,024 bits of user data), the WrCnt bits, and the poison bits.

One or more fields (e.g., bit fields) within a code word layout may be configured as code word error control code bits (e.g., CwECC bits). In some cases, CwECC bits may be configured to cover information contained in the CRC bits, the user data (e.g., 1,024 bits of user data), the WrCnt bits, and the poison bits. For example, CwECC bits may facilitate detection and correction of errors present in the above identified fields within a certain limit in the quantity of error bits.

One or more fields (e.g., bit fields) within a code word layout may be configured as repair bits. In some cases, the repair bits may be referred to as XOR/Sub bits. Each of the XOR/Sub bit may include a digital or Boolean logic exclusive OR (XOR) product of corresponding bits of other channels of a respective channel burst. For example, K7 bit (e.g., the most significant bit of a group of 8-bits in the channel 310-k) of the second channel burst (e.g., the second channel burst 320-2) may include an exclusive OR (XOR) product of A7 bit (e.g., the most significant bit of a group of 8-bits in the channel 310-a) through J7 bit (e.g., the most significant bit of a group of 8-bits in the channel 310-j) within the second channel burst. In this manner, K7 bit of the second channel burst may facilitate reconstruction of a bit within the second channel burst (e.g., G7 bit of the second channel burst 320-2) if the bit (e.g., G7 bit of the second channel burst 320-2) is determined to be faulty. In some cases, the repair bit (e.g., K7 bit of the second channel burst 320-2) may replace a faulty bit when the faulty bit (e.g., G7 bit of the second channel burst 320-2) repeatedly become faulty.

One or more fields (e.g., bit fields) within a code word layout may be configured as spare bits. In some cases, spare bits may be configured to operate as spares to replace bits designated to have failed for the code word. In some cases, the bits designated to have failed may be associated with memory cells within a 3DXP die, which may have become faulty. The spare bits may be routed to replace the bits designated to have failed to support a reliable transaction of the user data within the code word. In some cases, some fields of CRC bits may be configured as spare bits. In other cases, some fields of repair bits (e.g., XOR/Sub bits) may be configured as spare bits. In other words, a quantity of spare bits within a code word layout may be configurable as exchangeable for a quantity of fields for the CRC bits or the repair bits. In some cases, the quantity of spare bits may be determined based on a maturity of memory technology (e.g., 3D XPoint™, FeRAM, MRAM technologies) used to build memory media (e.g., memory media 130, memory media 295).

Still referring to FIG. 3, various fields (e.g., bit fields) within a code word layout may be configured (e.g., arranged) to support a low latency operation during an access operation associated with a memory medium. FIG. 3 includes layouts 301 through 305 illustrating various configuration of a group of 8-bits for an individual channel (e.g., each of the channels 310-a through 310-k). For example, each layout of the layouts 301 through 305 includes a group of eight (8) bits that a memory device (e.g., 3DXP die) within a memory medium (e.g., a memory medium 295-a) may produce at a given channel burst.

Layout 301 may include one or more (e.g., three) fields of CwCon bits, one or more (e.g., two) fields of CRC bits (which may be configured as spare bit), and one or more (e.g., three) fields of XOR/Sub bits (e.g., repair bits, which may be configured as spare bits as an option). Layout 302 may include one or more (e.g., three) fields of CwCon bits, one or more (e.g., two) fields of CRC bits (which may be configured as spare bits as an option), one or more (e.g., two) fields of XOR/Sub bits (e.g., repair bits, which may be configured as spare bits as an option), and one or more WrCnt bits (e.g., a counter bit). Layout 303 may include one or more (e.g., three) fields of CwCon bits, one or more (e.g., two) fields of CRC bits (which may be configured as spare bits as an option), and one or more (e.g., three) fields of WrCnt bits. Layout 304 may include one or more (e.g., three) fields of CwCon bits, one or more (e.g., two) fields of CRC bits (which may be configured as spare bits as an option), one or more fields of WrCnt bits, and one or more (e.g., two) fields of poison bits (e.g., flag bits). Layout 305 may include one or more (e.g., three) fields of CwCon bits, one or more (e.g., two) fields of XOR/Sub bits (which may be configured as spare bits as an option), and one or more (e.g., three) fields of XOR/Sub bits.

As an example of a code word layout that facilitates a low latency operation, a subset of bit fields corresponding to the first channel burst (e.g., the channel burst 320-1) may be configured as illustrated in the layout 306. In the layout 306, each group of 8-bits of channel 310-a (e.g., A7 . . . A0) and channel 310-b (e.g., B7 . . . B0) may be configured to have the layout 301. Also, a group of 8-bits of channel 310-c (e.g., C7 . . . C0) may be configured to have the layout 302. At least some if not each group of 8-bits of channel 310-d (e.g., D7 . . . D0) through channel 310-i (e.g., I7 . . . I0) may be configured to have the layout 303. A group of 8-bits of channel 310-j (e.g., J7 . . . J0) may be configured to have the layout 304. Further, a group of 8-bits of channel 310-k (e.g., K7 . . . K0) may be configured to have the layout 305.

As a result of configuring the subset of bit fields (e.g., a total of 88 bits including eight (8) bits from each channel of eleven (11) channels) corresponding to the first channel burst (e.g., the first channel burst 320-1) of the code word layout 300, the first channel burst of 88 bits (e.g., the 88 bits of the layout 306) may include various information to facilitate a low latency, reliable transaction of an access operation associated with the code word (e.g., reading 1,024 bits of user data). In some cases, a port manager (e.g., a port manager 260-a) may receive a first portion of a code word (e.g., the bits of the layout 306 corresponding to the first channel burst 320-1) associated with a memory medium. The port manager may parse the first portion of the code word (e.g., identifying information from the CwCon bits, identifying the spare bits, identifying the counter bits) while the port manager receives additional portions of the code word (e.g., the bits of the code word layout 300 corresponding to a second channel burst 320-2, and so on) during subsequent channel bursts. As such, the port manager may parallelize various operations associated with the code word to supply reliable information to a host device with a low latency.

The code word layout 300 may also illustrate user data field of 1,024 bits (e.g., channels 310-a through 310-h over the second channel burst 320-2 through the 16th channel burst 320-16, and channels 310-i and 310-j over the second channel burst 320-2 through the fifth channel burst 320-5), CwECC fields (e.g., channels 310-i and 310-j over the 6th channel burst 320-6 through the 16th channel burst 320-16), and XOR/Sub fields (e.g., channel 310-k over the second channel burst 320-2 through the 16th channel burst 320-16).

Within the first channel burst (e.g., the first channel burst 320-1), there may be a total of 33 fields of CwCon bits, three fields per each channel, across the entire eleven (11) channels (e.g., channels 310-a through 310-k), for example. A total quantity of fields for CwCon bits (e.g., a total of 33 fields) may represent one of a plurality of code word states (e.g., four different states of a code word). The total quantity of fields for CwCon bits may be determined to provide a certain redundancy of information that CwCon bits are configured to indicate (e.g., one of four different states) such that a quantity of errors in the CwCon field may be tolerated. In some cases, up to eleven (11) errors out of 33 CwCon bits may be tolerated to indicate a valid state of a code word. In addition, a quantity of CwCon fields may be distributed across entire channels (e.g., eleven (11) channels as illustrated with the layout 306) to provide a probability of having errors associated with CwCon bits distributed approximately equal across the entire channels.

Furthermore, as a port manager (e.g., the port manager 260-a described with reference to FIG. 2) may receive a quantity of CwCon bits at the first channel burst (e.g., the first channel burst 320-1) of a code word associated with a memory medium (e.g., the memory medium 295-a), the port manager may interpret (e.g., parse) information in the CwCon bits concurrently with receiving an additional portion of the code word. As a result, the port manager may initiate reconfiguring the code word concurrently with receiving the additional portion of the code word. For example, the port manager may initiate inverting at least a bit of the code word when the port manager interprets (e.g., parses) CwCon bits to indicate that the code word is an inverted code word. In other examples, the port manager may initiate determining a forwarding address associated with the code word based on determining the code word condition including a type of the code word indicating a forwarded code word. As such, the port manager may reconfigure the code word without having to wait until the port manager receives the entire code word to facilitate a low latency operation associated with the code word.

Within the first channel burst (e.g., the first channel burst 320-1), there may be up to a total of 22 fields of spare bits, two fields per each channel, across the entire eleven (11) channels (e.g., channels 310-a through 310-k), for example. In some cases, two spare bits per each channel may facilitate implementing the spare bits to replace faulty bits within the channel. As described herein, the faulty bits may be associated with memory cells of a memory device (e.g., a 3DXP die) within a memory medium (e.g., memory medium 295-a).

Furthermore, as a port manager (e.g., a port manager 260-a) may receive spare bits at the first channel burst (e.g., up to 22 spare bits in the first channel burst 320-1) of a code word associated with a memory medium (e.g., the memory medium 295-a), the port manager may implement spare bits to replace faulty bits as soon as the port manager identifies the faulty bits at a later channel burst. For example, when the port managers determines that D1 bit of the channel 310-*d* within the third channel burst 320-3 may be a first faulty bit, the port manager may replace the D1 bit of the channel 310-*d* within the third channel burst 320-3 with a first spare bit (e.g., a spare bit A4 of the channel 310-*a* within the first channel burst 320-1) as soon as the port manager receives the faulty D1 bit at the third channel burst 320-3. As such, the port manager may have a sufficient time to substitute spare bits for failed bits before the port manager may apply information available in the CwECC fields (e.g., CwECC bits available at the 6th channel burst 320-6 and on) to initiate an error control operation. In this manner, the port manager may implement the spare bits before the port manager may initiate an error control operation for a code word so as to facilitate a low latency operation associated with the code word.

A port manager (e.g., the port manager 260-*a*) may receive the XOR/Sub fields in parallel with the other code word information at a given channel burst such that the port manager may perform the XOR reconstruction of data when the port manager determines that a channel failure exists and that its information associated with the faulty channel may be rebuilt based on the information stored in the XOR/Sub fields. In this manner, the port manager may reconstruct corresponding bits in another channel of a given channel burst as the port manager receives information at the given channel burst so as to facilitate a low latency operation associated with the code word.

In some cases, the CwECC fields may be distributed across the last few channel bursts (e.g., the channel bursts 320-14 through 320-16) and a port manager (e.g., the port manager 260-*a*) may have to wait until it receives almost entire code word before initiating an error control operation based on the information in the CwECC fields. On the contrary, the port manager may receive the CwECC fields as early as the 6th channel burst (e.g., the 6th channel burst 320-6 and on) as illustrated in the code word layout 300. In this manner, the port manager may initiate an error control operation based on the information in the CwECC field it received at the 6th channel burst (e.g., the 6th channel burst 320-6) so as to facilitate a low latency operation associated with the code word.

As illustrated in the example code word layout 300, the first channel burst (e.g., the first channel burst 320-1) may include irregularities associated with various fields including various information. On the contrary, remaining channel bursts (e.g., the second channel burst 320-2 through the 16th channel burst 320-16) may include regularities associated with user data fields, the XOR/Sub fields, and the CwECC fields. Such regularity in the code word layout 300 may facilitate a low latency operation associated with the code word by simplifying a hardware configuration based on the regularities.

Figure 4:
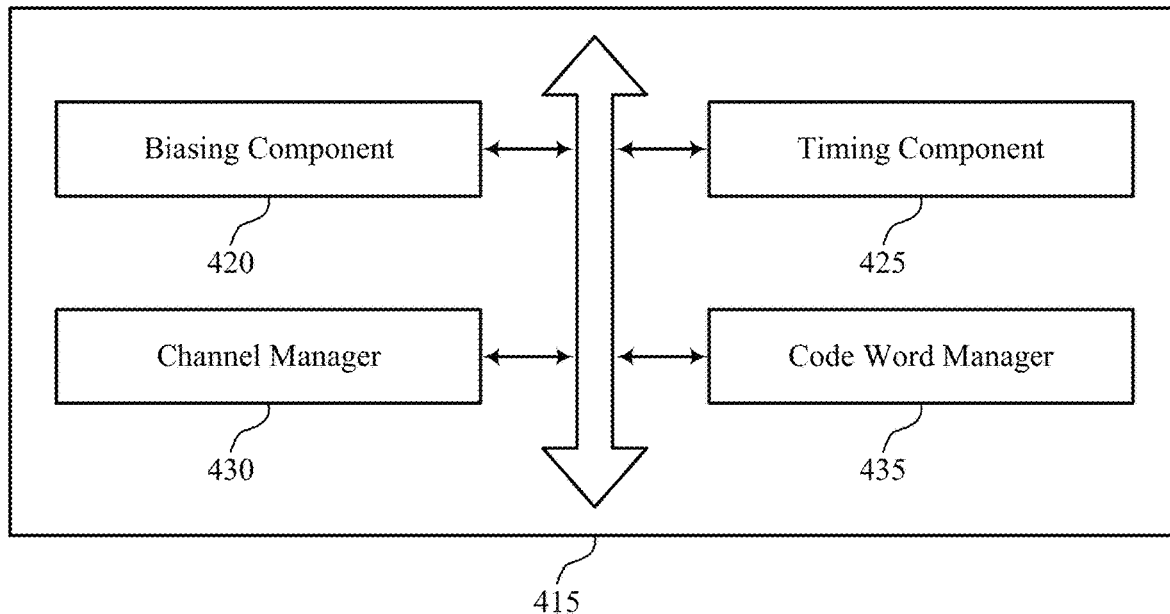
FIG. 4 shows a block diagram of a device that supports a code word format and structure in accordance with aspects of the present disclosure

FIG. 4 shows a block diagram 400 of a controller 415 that supports a code word format and structure in accordance with aspects of the present disclosure. The controller 415 may be an example of aspects of the controller 120 or the controller 230 described with reference to FIGS. 1 through 2. The controller 415 may include a biasing component 420, a timing component 425, a channel manager 430, and a code word manager 435. Each of these modules may communicate, directly or indirectly, with one another (e.g., via one or more buses).

Channel manager 430 may receive a first portion of a code word associated with a memory medium, the code word including a set of bit fields indicative of a set of channel bursts across a set of channels, communicate with the memory medium based on parsing the first portion of the code word, and receive a second portion of the code word in a second channel burst after receiving the first portion of the code word in the first channel burst, where the second portion may include bits associated with an error correction code (ECC) operation.

Code word manager 435 may parse the first portion of the code word concurrently with receiving an additional portion of the code word based on receiving the first portion of the code word. In some cases, the code word manager 435 may identify at least one flag bit across at least one channel of a first channel burst in the set of bit fields of the code word based on receiving the first portion of the code word, the at least one flag bit indicating an invalidity of a portion of the code word, where the first portion of the code word may be parsed based on identifying the at least one flag bit.

In some cases, the code word manager 435 may invert at least some of bits of the code word based on the code word condition, where the code word condition may include an inversion status of the bits of the code word. In some cases, the code word manager 435 may determine a forwarding address of the code word based on the code word condition, where the code word condition may include a type of the code word indicating a forwarded code word that may include at least one copy of a valid address associated with the code word, where communicating with the memory medium may include transmitting an access command to the memory medium using the forwarding address of the code word. In some cases, the code word manager 435 may identify spare bits in a bit field of the set for at least one channel of a first channel burst in the set of bit fields of the code word based on receiving the first portion of the code word, where the first portion of the code word may be parsed based on identifying the spare bits.

In some cases, the code word manager 435 may determine a code word condition indicated in a bit field of the set for at least one channel of a first channel burst in the set of bit fields of the first portion of the code word, where the first portion of the code word may be parsed based on the code word condition. In some cases, the code word manager 435 may identify cyclic redundancy check (CRC) bits in the first portion of the code word, the CRC bits including a bit field of the set for at least one channel of a first channel burst in the set of bit fields of the code word, where the first portion of the code word may be parsed based on identifying the CRC bits. In some cases, the code word manager 435 may identify repair bits in a bit field of the set for at least one channel of a first channel burst in the set of bit fields of the code word based on receiving the first portion of the code word, the repair bits storing information to reconstruct corresponding bits in another channel of the first channel burst, where the first portion of the code word may be parsed based on identifying the repair bits.

In some cases, the code word manager 435 may reconfigure the code word based on parsing the first portion of the code word concurrently with receiving the additional portion of the code word, where communicating with the memory medium may be based on reconfiguring the code word. In some cases, the code word manager 435 may identify counter bits in a bit field of the set for at least one channel of a first channel burst in the set of bit fields of the code word based on receiving the first portion of the code word, the counter bits may indicate a quantity of access operations associated with the code word, where the first portion of the code word may be parsed based on identifying the counter bits. In some cases, the code word manager 435 may substitute, before initiating an error correction code (ECC) operation, a subset of bits of the code word with the spare bits based on identifying the spare bits before initiating an error correction code (ECC) operation.

In some cases, determining the code word condition includes identifying information in the bit field of the set in a subset of channels of the set of channels in the set of bit fields of the first portion of the code word. In some cases, determining the code word condition includes determining the code word condition as a first code word condition from a set of preconfigured code word conditions. In some cases, the code word condition indicates at least one of a type of the code word or an inversion status of bits of the code word, or both. In some cases, one or more bits of the spare bits are configured to indicate at least one of CRC information or repair information. In some cases, each bit of the repair bits is configured to store an exclusive OR (XOR) product of corresponding bits of other channels of a respective channel burst.

Figure 5:
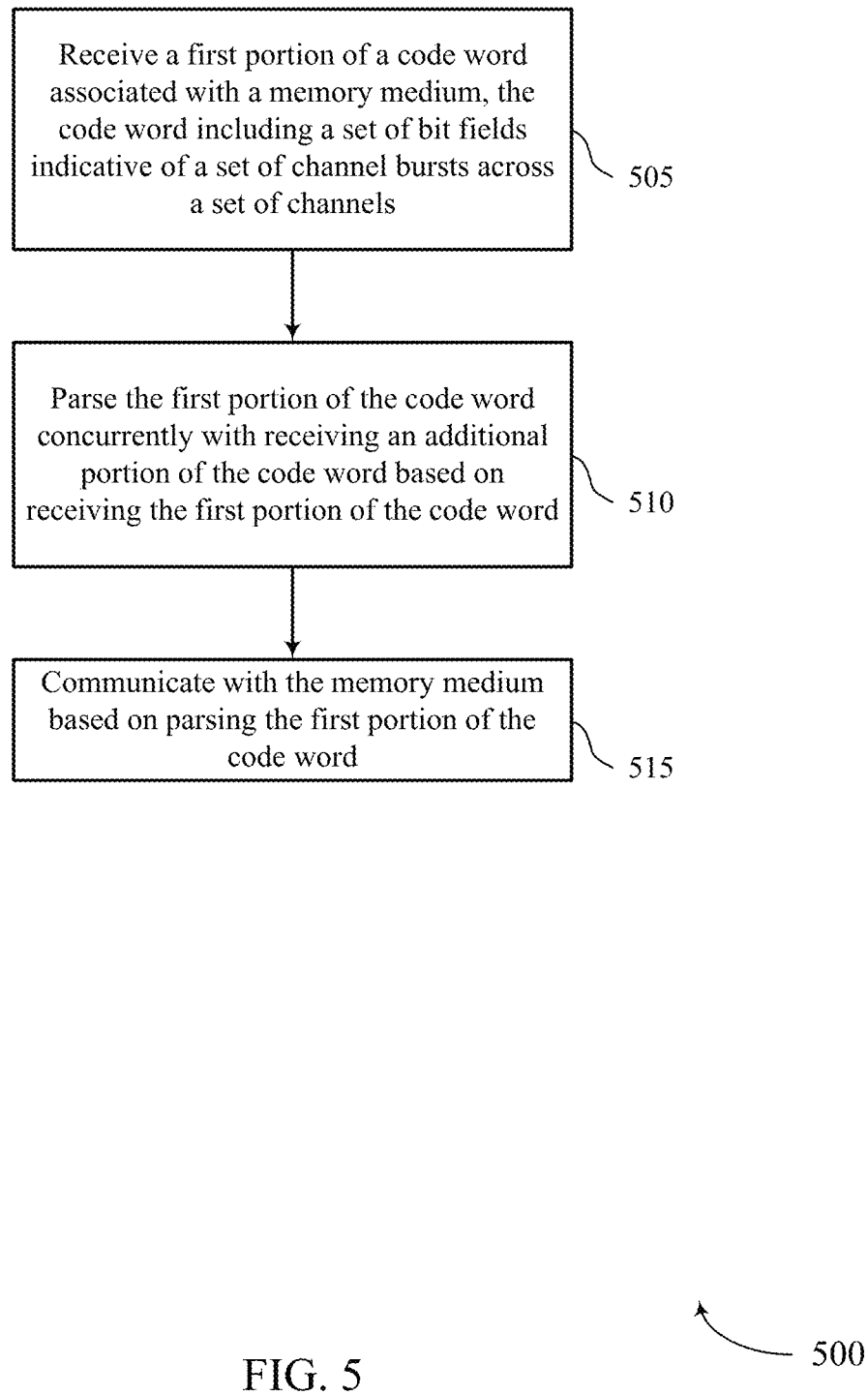
FIGS. 5 and 6 illustrate a method or methods supporting a code word format and structure in accordance with aspects of the present disclosure.

FIG. 5 shows a flowchart illustrating a method 500 that supports a code word format and structure in accordance with aspects of the present disclosure. The operations of method 500 may be implemented by a memory controller or its components as described herein, among other devices. For example, the operations of method 500 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 505 the controller may receive a first portion of a code word associated with a memory medium, the code word including a set of bit fields indicative of a plurality of channel bursts across a plurality of channels. The operations of 505 may be performed according to the methods described with reference to FIGS. 2-4. In certain examples, aspects of the operations of 505 may be performed by a channel manager as described with reference to FIG. 4.

At 510 the controller may parse the first portion of the code word concurrently with receiving an additional portion of the code word based on receiving the first portion of the code word. The operations of 510 may be performed according to the methods described with reference to FIGS. 2-4. In certain examples, aspects of the operations of 510 may be performed by a code word manager as described with reference to FIG. 4.

At 515 the controller may communicate with the memory medium based on parsing the first portion of the code word. The operations of 515 may be performed according to the methods described with reference to FIGS. 2-4. In certain examples, aspects of the operations of 515 may be performed by a channel manager as described with reference to FIG. 4.

An apparatus for performing the method 500 is described. The apparatus may include means for receiving a first portion of a code word associated with a memory medium, the code word including a set of bit fields indicative of a plurality of channel bursts across a plurality of channels, means for parsing the first portion of the code word concurrently with receiving an additional portion of the code word based on receiving the first portion of the code word, and means for communicating with the memory medium based on parsing the first portion of the code word.

Another apparatus for performing the method 500 is described. The apparatus may include a memory medium and a controller in electronic communication with the memory medium, wherein the controller may be operable to receive a first portion of a code word associated with a memory medium, the code word including a set of bit fields indicative of a plurality of channel bursts across a plurality of channels, parse the first portion of the code word concurrently with receiving an additional portion of the code word based on receiving the first portion of the code word, and communicate with the memory medium based on parsing the first portion of the code word.

Some examples of the method 500 and apparatus described herein may further include processes, features, means, or instructions for determining a code word condition indicated in a bit field of the set for at least one channel of a first channel burst in the set of bit fields of the first portion of the code word, wherein the first portion of the code word may be parsed based on the code word condition. In some examples of the method 500 and apparatus described herein, determining the code word condition may include identifying information in the bit field of the set in a subset of channels of the plurality of channels in the set of bit fields of the first portion of the code word.

In some examples of the method 500 and apparatus described herein, determining the code word condition may include determining the code word condition as a first code word condition from a plurality of preconfigured code word conditions. In some examples of the method 500 and apparatus described herein, the code word condition indicates at least one of a type of the code word or an inversion status of bits of the code word, or both. Some examples of the method 500 and apparatus described herein may further include processes, features, means, or instructions for inverting at least a bit of the code word based on the code word condition, wherein the code word condition may include an inversion status of the bits of the code word.

Some examples of the method 500 and apparatus described herein may further include processes, features, means, or instructions for determining a forwarding address of the code word based on the code word condition, wherein the code word condition may include a type of the code word indicating a forwarded code word that may include at least one copy of a valid address associated with the code word, wherein communicating with the memory medium may include transmitting an access command to the memory medium using the forwarding address of the code word. Some examples of the method 500 and apparatus described herein may further include processes, features, means, or instructions for identifying spare bits in a bit field of the set for at least one channel of a first channel burst in the set of bit fields of the code word based on receiving the first portion of the code word, wherein the first portion of the code word may be parsed based on identifying the spare bits.

Some examples of the method 500 and apparatus described herein may further include processes, features, means, or instructions for receiving a second portion of the code word in a second channel burst after receiving the first portion of the code word in the first channel burst, wherein the second portion may include bits associated with an error correction code (ECC) operation. Some examples of the method 500 and apparatus described herein may further include processes, features, means, or instructions for substituting, before initiating an error correction code (ECC) operation, a subset of bits of the code word with the spare bits based on identifying the spare bits. In some examples of the method 500 and apparatus described herein, one or more bits of the spare bits may be configured to indicate at least one of cyclic redundancy check (CRC) information or repair information.

Some examples of the method 500 and apparatus described herein may further include processes, features, means, or instructions for identifying cyclic redundancy check (CRC) bits in the first portion of the code word, the CRC bits including a bit field of the set for at least one channel of a first channel burst in the set of bit fields of the code word, wherein the first portion of the code word may be parsed based on identifying the CRC bits.

Some examples of the method 500 and apparatus described herein may further include processes, features, means, or instructions for identifying repair bits in a bit field of the set for at least one channel of a first channel burst in the set of bit fields of the code word based on receiving the first portion of the code word, the repair bits storing information to reconstruct corresponding bits in another channel of the first channel burst, wherein the first portion of the code word may be parsed based on identifying the repair bits. In some examples of the method 500 and apparatus described herein, each bit of the repair bits may be configured to store an exclusive OR (XOR) product of corresponding bits of other channels of a respective channel burst.

Some examples of the method 500 and apparatus described herein may further include processes, features, means, or instructions for reconfiguring the code word based on parsing the first portion of the code word concurrently with receiving the additional portion of the code word, wherein communicating with the memory medium may be based on reconfiguring the code word. Some examples of the method 500 and apparatus described herein may further include processes, features, means, or instructions for identifying counter bits in a bit field of the set for at least one channel of a first channel burst in the set of bit fields of the code word based on receiving the first portion of the code word, the counter bits indicating a quantity of access operations associated with the code word, wherein the first portion of the code word may be parsed based on identifying the counter bits.

Some examples of the method 500 and apparatus described herein may further include processes, features, means, or instructions for identifying at least one flag bit across at least one channel of a first channel burst in the set of bit fields of the code word based on receiving the first portion of the code word, the at least one flag bit indicating an invalidity of a portion of the code word, wherein the first portion of the code word may be parsed based on identifying the at least one flag bit.

Figure 6:
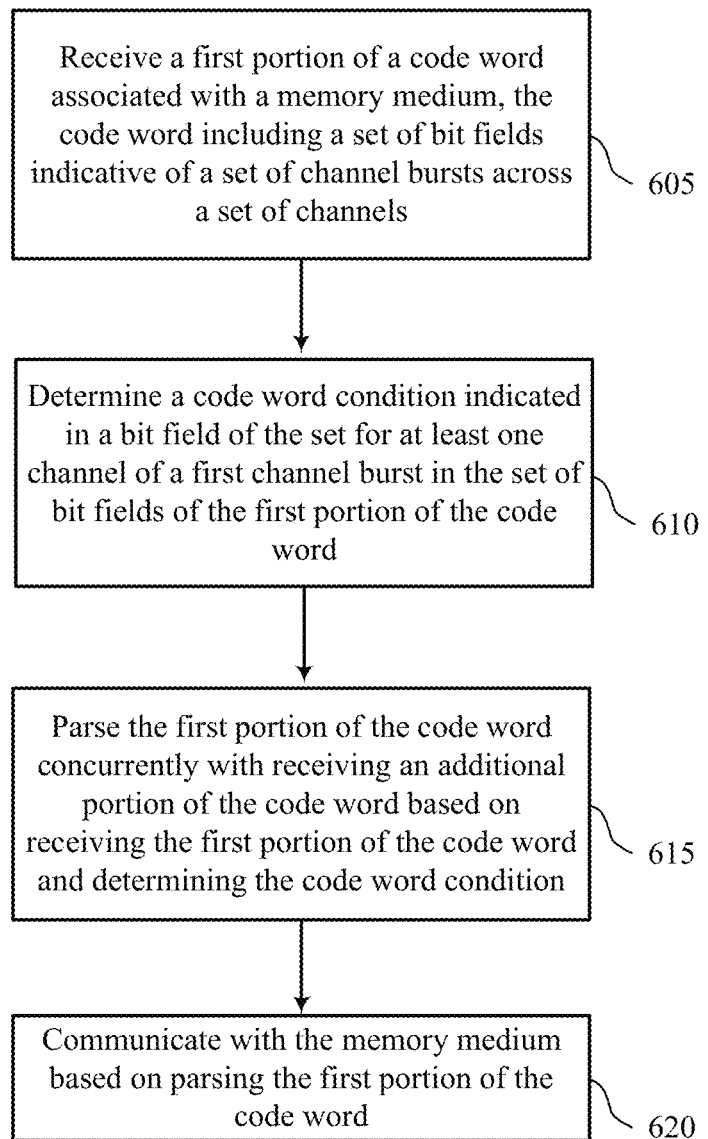

FIG. 6 shows a flowchart illustrating a method 600 that supports a code word format and structure in accordance with aspects of the present disclosure. The operations of method 600 may be implemented by a memory controller or its components as described herein, among other devices. For example, the operations of method 600 may be performed by the controller 120 or the controller 230 described with reference to FIGS. 1 through 2. In some examples, a controller may execute a set of codes to control the functional elements of the device to perform the functions described below. Additionally or alternatively, the controller may perform aspects of the functions described below using special-purpose hardware.

At 605 the controller may receive a first portion of a code word associated with a memory medium, the code word including a set of bit fields indicative of a plurality of channel bursts across a plurality of channels. The operations of 605 may be performed according to the methods described with reference to FIGS. 2-4. In certain examples, aspects of the operations of 605 may be performed by a channel manager as described with reference to FIG. 4.

At 610 the controller may determine a code word condition indicated in a bit field of the set for at least one channel of a first channel burst in the set of bit fields of the first portion of the code word. The operations of 610 may be performed according to the methods described with reference to FIGS. 2-4. In certain examples, aspects of the operations of 610 may be performed by a code word manager as described with reference to FIG. 4.

At 615 the controller may parse the first portion of the code word concurrently with receiving an additional portion of the code word based on receiving the first portion of the code word and determining the code word condition. The operations of 615 may be performed according to the methods described with reference to FIGS. 2-4. In certain examples, aspects of the operations of 615 may be performed by a code word manager as described with reference to FIG. 4.

At 620 the controller may communicate with the memory medium based on parsing the first portion of the code word. The operations of 620 may be performed according to the methods described with reference to FIGS. 2-4. In certain examples, aspects of the operations of 620 may be performed by a channel manager as described with reference to FIG. 4.

It should be noted that the methods described herein describe possible implementations, and that the operations and the steps may be rearranged or otherwise modified and that other implementations are possible. Further, examples from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The term "electronic communication" and "coupled" refer to a relationship between components that support electron flow between the components. This may include a direct connection between components or may include intermediate components.

Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

Chalcogenide materials may be materials or alloys that include at least one of the elements S, Se, and Te. Phase change materials discussed herein may be chalcogenide materials. Chalcogenide materials may include alloys of S, Se, Te, Ge, As, Al, Sb, Au, indium (In), gallium (Ga), tin (Sn), bismuth (Bi), palladium (Pd), cobalt (Co), oxygen (O), silver (Ag), nickel (Ni), platinum (Pt). Example chalcogenide materials and alloys may include, but are not limited to, Ge—Te, In—Se, Sb—Te, Ga—Sb, In—Sb, As—Te, Al—Te, Ge—Sb—Te, Te—Ge—As, In—Sb—Te, Te—Sn—Se, Ge—Se—Ga, Bi—Se—Sb, Ga—Se—Te, Sn—Sb—Te, In—Sb—Ge, Te—Ge—Sb—S, Te—Ge—Sn—O, Te—Ge—Sn—Au, Pd—Te—Ge—Sn, In—Se—Ti—Co, Ge—Sb—Te—Pd, Ge—Sb—Te—Co, Sb—Te—Bi—Se, Ag—In—Sb—Te, Ge—Sb—Se—Te, Ge—Sn—Sb—Te, Ge—Te—Sn—Ni, Ge—Te—Sn—Pd, or Ge—Te—Sn—Pt. The hyphenated chemical composition notation, as used herein, indicates the elements included in a particular compound or alloy and is intended to represent all stoichiometries involving the indicated elements. For example, Ge—Te may include $Ge_xTe_y$, where x and y may be any positive integer. Other examples of variable resistance materials may include binary metal oxide materials or mixed valence oxide including two or more metals, e.g., transition metals, alkaline earth metals, and/or rare earth metals. Examples are not limited to a particular variable resistance material or materials associated with the memory elements of the memory cells. For example, other examples of variable resistance materials can be used to form memory elements and may include chalcogenide materials, colossal magnetoresistive materials, or polymer-based materials, among others.

The devices discussed herein, including memory media 130, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels;
identifying at least one error bit in the second portion of the code word based at least in part on the CRC field; and
parsing the first portion of the code word based at least in part on identifying the at least one error bit in the second portion of the code word.

2. The method of claim 1, wherein the CRC field is one of a plurality of fields received in a single burst of the plurality of bursts.

3. The method of claim 1, wherein the second portion of the code word comprises a plurality of data fields including one or more of a user data field, a counter bit field, or a poison bit field.

4. A method, comprising:
receiving, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels; and
identifying at least one error bit in the second portion of the code word based at least in part on the CRC field, wherein the CRC field comprises a spare bit, and wherein the at least one error bit indicates bit failure.

5. The method of claim 4, further comprising:
replacing the at least one error bit of the second portion of the code word with the spare bit received in the CRC field of the first portion of the code word.

6. A method, comprising:
receiving, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels; and
identifying at least one error bit in the second portion of the code word based at least in part on the CRC field, wherein identifying the at least one error bit comprises:
identifying, based at least in part on the received second portion of the code word comprising a first quantity of errors that is less than a threshold, the at least one error bit based at least in part on an error control code field in the first portion of the code word.

7. An apparatus, comprising:
one or more processors;
one or more memories coupled with the one or more processors; and
instructions stored in the one or more memories and executable, individually, or collectively, by the one or more processors to cause the apparatus to:
receive, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels;
identify at least one error bit in the second portion of the code word based at least in part on the CRC field; and
parse the first portion of the code word based at least in part on identifying the at least one error bit in the second portion of the code word.

8. The apparatus of claim 7, wherein the instructions to identify the at least one error bit are further executable, individually or collectively, by the one or more processors to cause the apparatus to:
identify, based at least in part on the received second portion of the code word comprising a first Quantity of errors that is less than a threshold, the at least one error bit based at least in part on an error control code field in the first portion of the code word.

9. The apparatus of claim 7, wherein the CRC field is one of a plurality of fields received in a single burst of the plurality of bursts.

10. The apparatus of claim 7, wherein the second portion of the code word comprises a plurality of data fields including one or more of a user data field, a counter bit field, or a poison bit field.

11. An apparatus, comprising:
one or more processors;
one or more memories coupled with the one or more processors; and
instructions stored in the one or more memories and executable, individually or collectively, by the one or more processors to cause the apparatus to:
receive, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels; and
identify at least one error bit in the second portion of the code word based at least in part on the CRC field, wherein the CRC field comprises a spare bit, and wherein the at least one error bit indicates bit failure.

12. The apparatus of claim 11, wherein the instructions are further executable, individually or collectively, by the one or more processors to cause the apparatus to:
replace the at least one error bit of the second portion of the code word with the spare bit received in the CRC field of the first portion of the code word.

13. A non-transitory computer-readable medium storing code, the code comprising instructions executable, individually, or collectively, by one or more processors to:
receive, from a memory device, a plurality of bursts over a plurality of channels, the plurality of bursts comprising a first portion of a code word and a second portion of the code word, the first portion of the code word comprising a cyclic redundancy check (CRC) field comprising a plurality of bits across at least one channel of the plurality of channels;

identify at least one error bit in the second portion of the code word based at least in part on the CRC field; and parse the first portion of the code word based at least in part on identifying the at least one error bit in the second portion of the code word.

14. The non-transitory computer-readable medium of claim 13, wherein the CRC field comprises a spare bit and the at least one error bit indicates bit failure.

15. The non-transitory computer-readable medium of claim 14, wherein the instructions are further executable, individually or collectively, by the one or more processors to:

replace the at least one error bit of the second portion of the code word with the spare bit received in the CRC field of the first portion of the code word.

16. The non-transitory computer-readable medium of claim 13, wherein the instructions to identify the at least one error bit are further executable, individually or collectively, by the one or more processors to:

identify, based at least in part on the received second portion of the code word comprising a first Quantity of errors that is less than a threshold, the at least one error bit based at least in part on an error control code field in the first portion of the code word.

17. The non-transitory computer-readable medium of claim 13, wherein the CRC field is one of a plurality of fields received in a single burst of the plurality of bursts.

* * * * *